United States Patent Office.

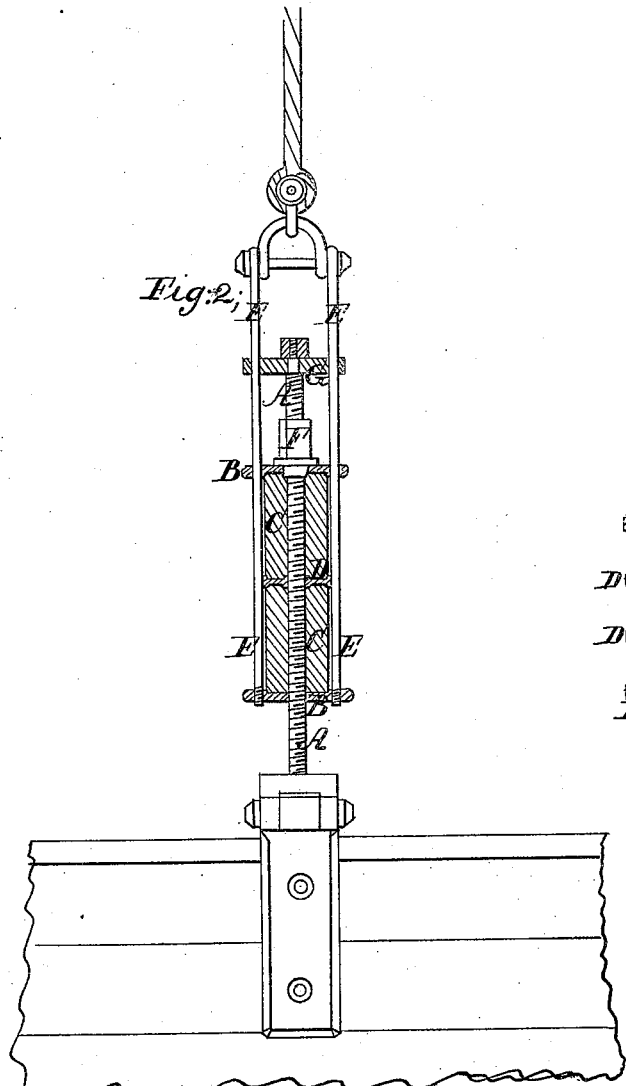

J. E. JONES, OF WARETOWN, NEW JERSEY.

Letters Patent No. 99,320, dated February 1, 1870.

IMPROVEMENT IN ELASTIC LANYARDS.

The Schedule referred to in these Letters Patent and making part of the same.

To all whom it may concern:

Be it known that I, J. E. JONES, of Waretown, in the county of Ocean, and State of New Jersey, have invented a new and improved Elastic Lanyard; and I do hereby declare that the following is a full, clear, and exact description thereof, which will enable others skilled in the art to make and use the same, reference being had to the accompanying drawing, forming part of this specification, in which—

Figure 1 is a detail sectional view of my improved lanyard.

Figure 2 is a detail sectional view of a modified form of the same.

Figure 3 is a side view, partly in section, of another modified form of the same.

My invention has for its object to furnish an improvement in lanyards, by means of which the lanyards may be prevented from breaking when exposed to a sudden strain, which, coming suddenly upon taut ropes, is liable to break them, and at a time when they are most needed to support the rigging of a vessel; and It consists in the construction and combination of the various parts of the devices, as hereinafter more fully described.

A is a bar, upon one end of which is formed an eye, to enable it to be conveniently pivoted or hinged to the chain-plate.

B are plates, through holes in the centres of which the rod or bar A passes, and which can slide longitudinally upon the said rod A.

Between the plates B are placed rubber blocks C, preferably of cylindrical form, as shown in figs. 1, 2, and 3. The blocks or springs C should be cut into short lengths, so that they will not bulge too much in the centre when compressed, plates D being interposed between the ends of the said parts, as shown in the drawings.

The plates B and D should be flanged, as shown in figs. 1, 2, and 3, to keep the ends of the blocks C in place.

The blocks or springs C have holes formed through them longitudinally for the passage of the rod upon which they are placed, and they may be placed upon the rod A, using one set, or upon the rods E, using two sets, according to the amount of strain they will each have to bear.

E are two rods or bars, which pass through holes in the upper plate, B, and screw into or are otherwise secured to the lower plate B.

The upper part of the rod or bar A has a screw-thread cut upon it, to receive the nut F, which is screwed down against the upper plate B, as shown in figs. 1 and 2, to enable the springs C to be compressed more or less, to adjust the device so that it may begin to yield at any desired amount of force. The nut F also enables the slack of the lanyard to be conveniently taken up.

The upper end of the rod A is squared off, to enter a square hole in the arm or cross-bar G, in which it is secured by a nut screwed upon its extreme end.

The arm or cross-bar G has holes formed through its ends for the passage of the bars E, so that the said cross-bar G may slide freely upon the said bars or rods E. This guards against the nuts F being turned off by the turning or twisting of the lanyard.

The rope of the lanyard is connected with the upper ends of the two bars E, by means of shackles, clevises, or other convenient devices.

If desired, the screw-thread to receive the nuts F, may be cut upon the rods E, instead of being cut upon the rod A, as shown in fig. 3. In this case, the ends of the rods E are secured to the ends of the bar G, to prevent their turning, and the end of the rod A is swivelled to the lower plate B, so that the said rod may turn freely in the three plates B B G. By this construction, the tendency of the strain will be to press the plates B toward each other, compressing the rubber springs C, so that the elasticity of said springs may sustain the sudden strain, thus preventing the breakage of the lanyard.

All the above-described parts have been long known to the public specifically, and in other combinations. I therefore do not design to claim any of them separately.

Having thus described my invention,

I claim as new, and desire to secure by Letters Patent—

A lanyard, formed by combining a spring, made of short blocks, C, placed between flanged plates B D, to obviate the central bulge, a threaded rod, A, and nut F, to take up the slack, and the sliding cross-bar G, and rods E, to prevent the twisting off of the nut, all constructed and arranged, with respect to each other, in the manner described.

The above specification of my invention signed by me, this 30th day of July, 1869.

J. E. JONES.

Witnesses:
R. W. JONES,
JOHN SMITH.